United States Patent [19]
Mizutani

[11] Patent Number: 6,059,969
[45] Date of Patent: May 9, 2000

[54] AC GENERATOR STATOR COIL WITH NOISE REDUCTION

[75] Inventor: Akihiro Mizutani, Nagoya, Japan

[73] Assignee: Denso Corporation, Kariya, Japan

[21] Appl. No.: 09/276,497

[22] Filed: Mar. 25, 1999

[30] Foreign Application Priority Data

Mar. 26, 1998 [JP] Japan ................................. 10-079412

[51] Int. Cl.⁷ .................................................. H02K 1/22
[52] U.S. Cl. .......................... 210/263; 310/270; 310/208; 310/260; 310/254; 310/258; 310/259; 310/218; 310/61
[58] Field of Search .................................... 310/263, 270, 310/208, 260, 254, 258, 259, 218, 61

[56] References Cited

U.S. PATENT DOCUMENTS

| 911,708 | 2/1909 | Elshoff | 310/270 |
|---|---|---|---|
| 967,240 | 8/1910 | Robert | 310/270 |
| 1,122,187 | 12/1914 | Behrend | 310/270 |
| 3,942,057 | 3/1976 | Philofsky et al. | 310/260 |
| 4,418,295 | 11/1983 | Shiga | 310/59 |
| 5,084,641 | 1/1992 | Saima et al. | 310/51 |
| 5,705,865 | 1/1998 | Ishida et al. | 310/62 |

FOREIGN PATENT DOCUMENTS 63-64534   3/1988   Japan .

OTHER PUBLICATIONS

Journal of Nippondenso Technical Disclosure 48–116 Published: Jul. 15, 1986.
Journal of Nippondenso Technical Disclosure 117–017 Published: Nov. 15, 1997 pp. 17 & 17–2.

*Primary Examiner*—Nestor Ramirez
*Assistant Examiner*—Thanh Lam
*Attorney, Agent, or Firm*—Pillsbury Madison & Sutro LLP

[57] ABSTRACT

In an ac generator having a claw-pole type rotor, a stator winding has a plurality of front and rear coil ends. Each of the rear coil ends has an inside bent portion extending radially outward from the inner periphery of the rear end of the stator core and an inside main portion extending axially from the bent portion to form a backwardly expanding space around the rotor.

5 Claims, 2 Drawing Sheets

AC GENERATOR STATOR COIL WITH NOISE REDUCTION

CROSS REFERENCE TO RELATED APPLICATION

The present application is based on and claims priority from Japanese Patent Application Hei 10-79412 filed on Mar. 26, 1998, the contents of which are incorporated herein by reference.

BACKGROUND OF THE INVENTION

1. Field of the Invention

The present invention relates to a noise reduction structure of an ac generator for a vehicle.

2. Description of the Related Art

A rotor of an conventional ac generator has a pair of pole cores having a base portion and a plurality of claw pole pieces extending axially from the base portion disposed at opposite ends of the rotor. A stator core of a conventional ac generator has a plurality of coil ends extending from opposite ends thereof to surround the circumference of the claw poles. A centrifugal cooling fan is fixed to an end of the rotor to cool the plurality of coil ends.

It has been found that fan noise is caused when circulating air C1, as shown in FIG. 2, driven by such a centrifugal cooling fan is interrupted by inner peripheral surfaces C2 of the coil ends surrounding the centrifugal fan.

SUMMARY OF THE INVENTION

A main object of the invention is to provide an improved structure for reducing fan noise and noise generated when cooling air is interrupted by the coil ends, thereby improving cooling efficiency.

According to the invention, each of the rear coil ends of a stator winding has an air guiding inside surface. The air guiding inside surface is composed of an inside bent portion inclining or expanding radially outward from the inner periphery of the rear end of the stator core and an inside main portion extending axially from the bent portion to form a backwardly expanding space around a rear portion of the rotor. As a result, cooling air is guided by the inside surface to expand so that the speed and density of the cooling air can be regulated.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An ac generator that has a rotor according to a preferred embodiment of the invention is described with reference to the appended drawings.

Figure 1:
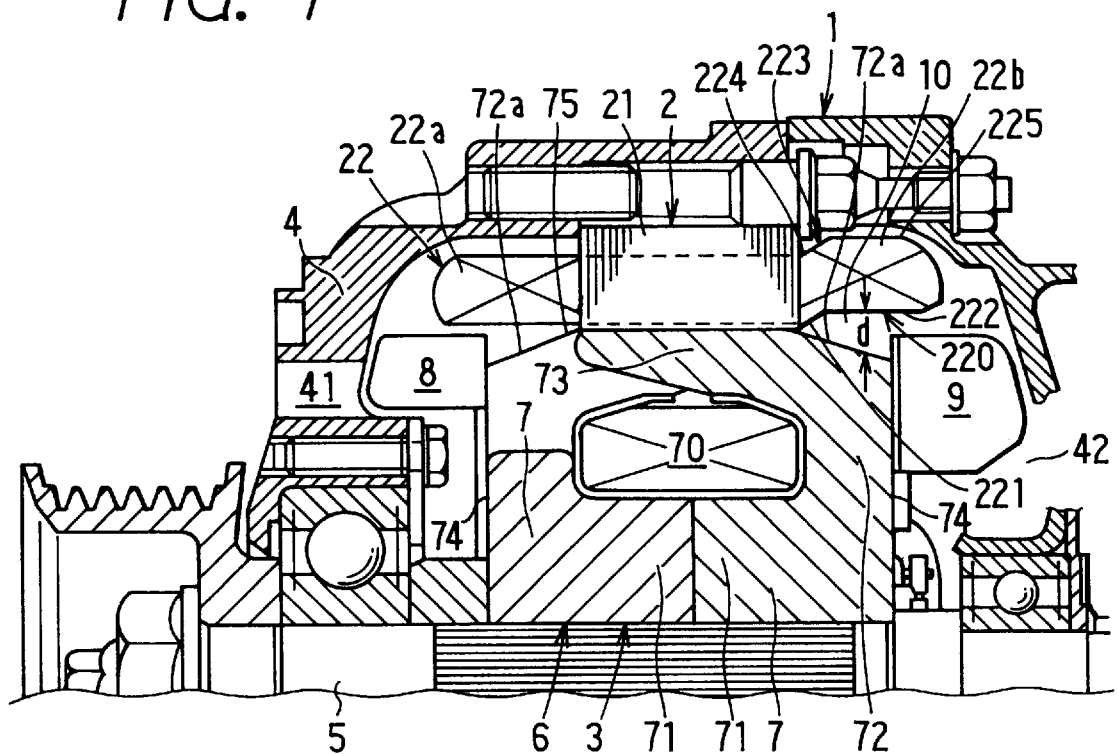
FIG. 1 is a longitudinal cross-sectional fragmentary view of an ac generator according to a preferred embodiment of the invention.

As shown in FIG. 1, an ac generator 1 is composed of stator 2, rotor 3, and housing 4.

Stator 2 is composed of stator core 21 supported by housing 4 and three-phase stator winding 22 disposed in a plurality of slots of stator core 21 via insulators. Stator winding 22 has a plurality of coil ends 22a extending forward from stator core 21 and a plurality of coil ends 22b extending backward from stator core 21.

Rotor 3 has shaft 5, rotor core 6, and field coil 8. Shaft 5 is supported by housing 4 via a pair of bearings, and rotor core 6 is composed of a pair of pole cores 7. Each of the pair of pole cores 7 has a cylindrical base portion 71, six claw-pole-pieces 73 extending axially via claw-base portion 72 from the outer periphery of base portion 71 at equal angles (e.g. 60°). The outer peripheral corner of claw-base portion 72 is chamfered to form taper or round surface 72a between claw-pole-pieces 73 and axial end 74 of pole core 7.

Mixed flow fan 8 is fixed to the front end 74 of rotor core 6. Mixed flow fan 8 supplies air from front air inlet 41 to front coil ends 22a and to rear portions of stator 2 through spaces between claw-pole-pieces to cool rear coil ends 22b. Centrifugal fan 9 is fixed to rear end 74 of rotor core 6 to supply air from rear inlet 42 to rear coil ends 22b. The air supplied by both fans 8, 9 are discharged to the outside of housing through openings formed in the outer periphery of housing 4.

Each of front coil ends 22a extends straight from the front end of stator core 21 in the axial direction. Accordingly, air driven by mixed flow fan 8 can be guided by front coil ends 22a toward the rear side of stator 2 effectively.

On the other hand, each of rear coil ends 22b is bent radially outward. Each of rear coil ends 22b has inside surface 220 and outside surface 223. Inside surface 220 is composed of inside bent portion 221 inclining radially outward from the inner periphery of the rear end of stator core 21 and inside main portion 222 extending axially around centrifugal fan 9. Inside bent portion 221 is formed at about 30% of inside surface 220 near the rear end of stator core 21. Thus, the diameter of inside surface 220 increases, thereby increasing distance d of the space between inside surface 220 and chamfered surface 72a. In other words, inside surface 220 extends axially and radially outward from inner periphery of the rear end of the stator core 21 to form a backwardly expanding space around the rear portion of rotor 3.

Outside surface 223 is also composed of outside bent portion 224 extending outwardly in parallel with inside bent portion 221 and outside main portion 225 extending in parallel with inside main portion 222.

Figure 2:
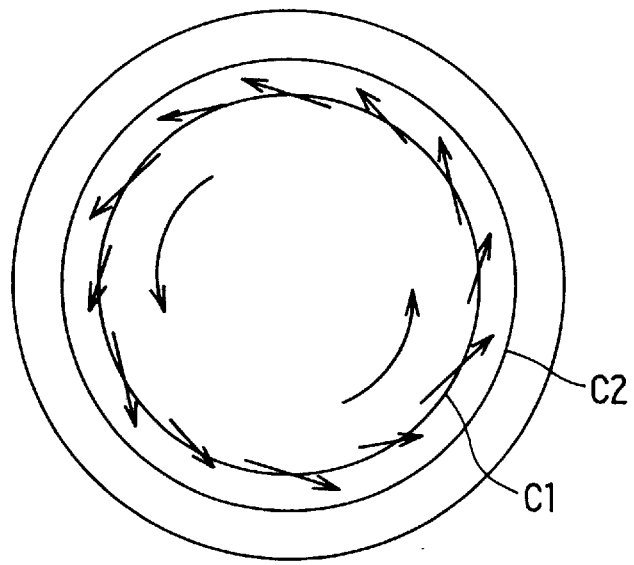
FIG. 2 illustrates cooling air flows around coil ends of the ac generator shown in FIG. 1.

When rotor 3 rotates, cooling air is generated by centrifugal fan and by claw-base portion 72. As shown in FIG. 2, the cooling air circulates in the space between the inside surfaces 220 of rear coil ends 22b and the outer periphery of rotor 3. The cooling air driven by centrifugal cooling fan 9 to flow radially outward and driven by the claw poles to flow in the circumferential direction. The side surfaces of the claw poles facing the rotating direction push the cooling air to form comparatively thicker and faster air flow and the other side surfaces pull the cooling air to form comparatively thinner and slower air flow.

When the cooling air flows through the space between inside surface 220 and chamfered surface 72a, it is guided by the inside surface 220 and expanded so that the speed and the density of the cooling air can be regulated. Thus, the cooling air is not abruptly interrupted by the coil ends, thereby reducing noise significantly. Noise can be also reduced by increasing the inclination of chamfered surface 72a or by reducing length of portions of the insulators extending from the rear end of the slots.

According to an experiment, chamfered surface 72a of a sample ac generator having inclination angle 20° to the axial direction reduces noise level at 1 meter from the sample about 8 db from a conventional ac generator having the same body size when they rotate at 10,000 RPM. Here, the sample ac generator has the following dimensions: maximum and minimum diameters of claw-base portion 72 are respectively 86 mm and 76 mm; axial length and arc length of chamfered surface 72a extending from the rear end of stator core 21 are respectively 9 mm and 23 mm; axial length of bent portions 221, 224 is respectively 4 mm; axial length of main portions 222, 225 is respectively 15 mm; maximum and minimum lengths of distance d are 1 mm and 8 mm respectively; and outside surface 223 of rear coil ends 22b is the same in shape as inside surface 220.

Figure 3:
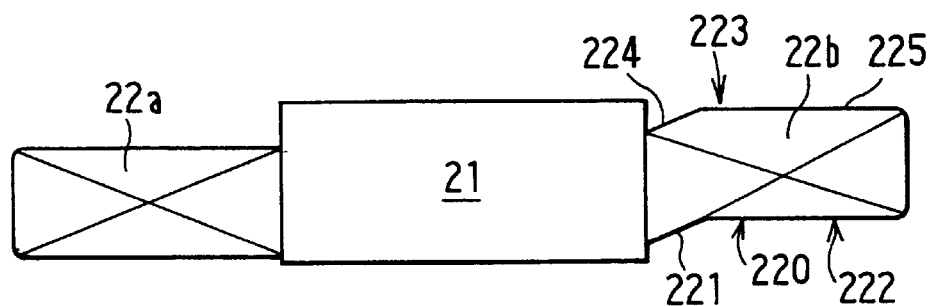
FIG. 3 is a schematic side view of the coil ends of the ac generator shown in FIG. 1.
Figure 4:
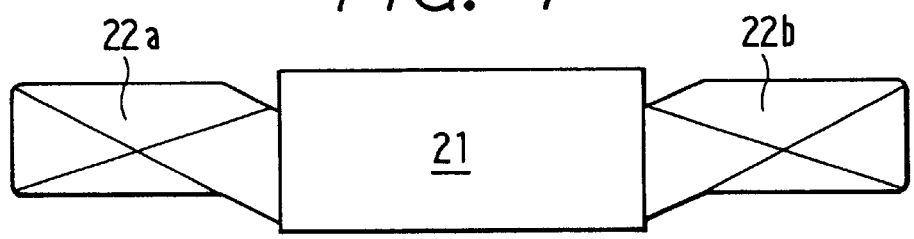
FIG. 4 is a schematic view of a variation of the coil ends shown in FIG. 3.

A first variation of stator 2 according to the preferred embodiment is shown in FIG. 4. The entire structure is the same as the preferred embodiment except front coil ends 22a. Front coil ends 22a have the same structure as rear coil ends 22b shown in FIG. 3 and described previously. This variation is effective when front mixed flow fan is substituted by a centrifugal fan.

Figure 5:
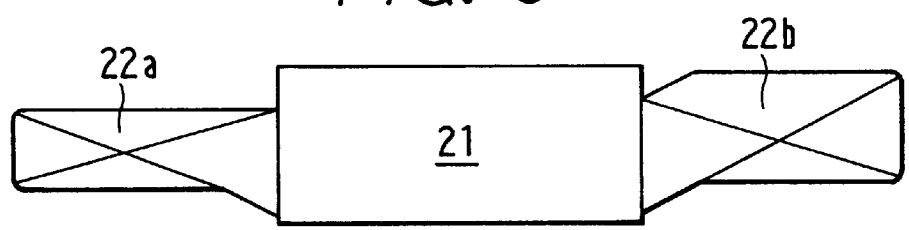
FIG. 5 is a schematic view of another variation of the coil ends shown in FIG. 3.

A second variation of stator 2 according to the preferred embodiment is described with reference to FIG. 5. The entire structure is the same as the first variation except front coil ends 22a. The inside surface of front coil ends 22a are the same in shape as the first variation, while the outside surface thereof are the same in shape as front coil ends 22a of the preferred embodiment. The inside surface of coil ends 22a is more effective to guide air toward the rear portion of stator 2.

Figure 6:
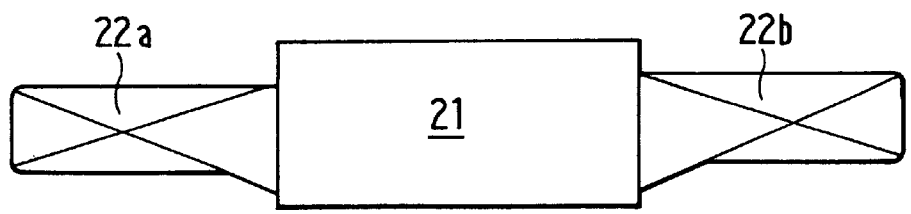
FIG. 6 is a schematic view of another variation of the coil ends shown in FIG. 3.

A third variation of stator 2 according to the invention is described with reference to FIG. 6. The entire structure is the same as the second embodiment except rear coil ends 22b. Rear coil ends 22b has the same structure as front coil ends 22a. The inside surfaces of both coil ends 22a, 22b are more effective to guide air in the axial direction.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An ac generator for a vehicle comprising:

a claw-pole type rotor;

a mixed flow fan, fixed to a front end of said rotor, for supplying cooling air axially rearward and radially outward;

a centrifugal cooling fan, fixed to a rear end of said rotor, for supplying cooling air radially outward; and a stator including a stator core having a plurality of slots and a stator winding disposed in said slots and having a plurality of front and rear coil ends; wherein each of said front coil ends has an inside straight portion extending axially forward from the inner periphery of said front end of said stator core, thereby guiding said cooling air driven by said mixed flow fan toward the rear side of said stator, and each of said rear coil ends has an inside bent portion, extending radially outward from the inner periphery of said rear end of said stator core and an inside main portion extending axially from said bent portion to form a backwardly expanding space around a rear peripheral portion of said rotor.

2. The ac generator as claimed in claim 1, wherein each of said rear coil ends has an outside bent portion extending outward in parallel with said inside bent portion.

3. The ac generator as claimed in claim 1, wherein said inside bent portion is formed at about 30% of said inside surface near said rear end of said stator core.

4. The ac generator as claimed in claim 1, wherein said rotor has a chamfered outer peripheral corner at the rear end thereof to guide cooling air driven by said centrifugal cooling fan so that the speed and the density of said cooling air can be regulated.

5. An ac generator for a vehicle comprising:

a claw-pole type rotor having a chamfered outer peripheral corner at the rear end thereof;

a front fan, fixed to a front end of said rotor, for supplying cooling air axially rearward and radially outward;

a rear fan, fixed to a rear end of said rotor, for supplying said cooling air radially outward; and a stator including a stator core having a plurality of slots and a stator winding disposed in said slots and having a plurality of front and rear coil ends, each of said front coil ends having an inside straight portion extending axially forward from the inner periphery of said front end of said stator core, each of said rear coil ends having an inside bent portion extending radially outward from the inner periphery of said rear end of said stator core and an inside main portion extending axially from said bent portion to form a backwardly expanding space around a rear peripheral portion of said rotor, whereby said cooling air supplied by said front and rear fan are guided by said expanding space so that the speed and the density of said cooling air can be regulated.

* * * * *

UNITED STATES PATENT AND TRADEMARK OFFICE
CERTIFICATE OF CORRECTION

PATENT NO. : 6,059,969
DATED : May 9, 2000
INVENTOR(S) : MITZUTANI

It is certified that error appears in the above-indentified patent and that said Letters Patent is hereby corrected as shown below:

On the title page, item [54] and col. 1,

Please change:

Title "AC GENERATOR STATOR COIL WITH NOISE REDUCTION"

to

--AC GENERATOR STATOR COIL WITH NOISE REDUCTION FEATURE--

Signed and Sealed this

Twentieth Day of March, 2001

*Attest:*

NICHOLAS P. GODICI

*Attesting Officer*     *Acting Director of the United States Patent and Trademark Office*